United States Patent
Watanabe et al.

(10) Patent No.: US 9,885,936 B2
(45) Date of Patent: Feb. 6, 2018

(54) MACH-ZEHNDER MODULATOR, METHOD FOR FABRICATING MACH-ZEHNDER MODULATOR

(71) Applicant: SUMITOMO ELECTRIC INDUSTRIES, LTD., Osaka (JP)

(72) Inventors: Masataka Watanabe, Yokohama (JP); Naoya Kono, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/605,637

(22) Filed: May 25, 2017

(65) Prior Publication Data

US 2017/0343881 A1    Nov. 30, 2017

(30) Foreign Application Priority Data

May 26, 2016    (JP) ................................. 2016-105449

(51) Int. Cl.
   *G02F 1/035*      (2006.01)
   *G02F 1/225*      (2006.01)
   *G02F 1/21*       (2006.01)

(52) U.S. Cl.
CPC ...... *G02F 1/2257* (2013.01); *G02F 2001/212* (2013.01); *G02F 2201/063* (2013.01)

(58) Field of Classification Search
USPC ...................................................... 385/2, 14
See application file for complete search history.

(56) References Cited

U.S. PATENT DOCUMENTS

2013/0177037 A1*   7/2013   Yagi ...................... H01S 5/3013
                                                      372/50.1
2015/0261058 A1*   9/2015   Silverstone ............. G02F 1/395
                                                       385/3

FOREIGN PATENT DOCUMENTS

JP         2006-065085       3/2006

* cited by examiner

*Primary Examiner* — Eric Wong
(74) *Attorney, Agent, or Firm* — Smith, Gambrell & Russell, LLP

(57) ABSTRACT

A Mach-Zehnder modulator includes: a support having a principal surface, the principal surface having a first area, a second area, and a third area; a first structure including first and second semiconductor mesas disposed on the first and second areas, respectively; a second structure including a first strip-shaped semiconductor region on the second area, a second strip-shaped semiconductor region on the third area, and a first strip-shaped void and a second strip-shaped void defining the first and second strip-shaped semiconductor regions; a first electrode disposed on the first semiconductor mesa in the first area, the first strip-shaped semiconductor region of the second structure being disposed between the support and the second semiconductor mesa of the first structure in the second area, and the first and second semiconductor mesas, and the first and second strip-shaped semiconductor regions being arranged to constitute a first arm waveguide of the Mach-Zehnder modulator.

6 Claims, 13 Drawing Sheets

MACH-ZEHNDER MODULATOR, METHOD FOR FABRICATING MACH-ZEHNDER MODULATOR

BACKGROUND OF THE INVENTION

Field of the Invention

The present invention relates to a Mach-Zehnder modulator, and a method for fabricating a Mach-Zehnder modulator. This application claims the benefit of priority from Japanese Patent application No. 2016-105449 filed on May 26, 2016, which is herein incorporated by reference in its entirety.

Related Background Art

Japanese Published Unexamined Patent Application No. 2006-065085 (Japanese Patent No. 4235154) discloses a Mach-Zehnder modulator.

SUMMARY OF THE INVENTION

A Mach-Zehnder modulator according to one aspect of the present invention includes: a support having a principal surface, the principal surface having a first area, a second area, and a third area; a first structure disposed on the principal surface of the support, the first structure including a first semiconductor mesa and a second semiconductor mesa disposed on the first area and the second area, respectively; a second structure disposed between the first structure and the principal surface of the support, the second structure including a first strip-shaped semiconductor region, a second strip-shaped semiconductor region, a first strip-shaped void, and a second strip-shaped void, the first strip-shaped semiconductor region and the second strip-shaped semiconductor region being disposed on the second area and the third area, respectively, and the first strip-shaped void and the second strip-shaped void defining the first strip-shaped semiconductor region and the second strip-shaped semiconductor region; a first electrode disposed on the first semiconductor mesa in the first area and connected to the first semiconductor mesa, the first strip-shaped semiconductor region of the second structure being disposed between the support and the second semiconductor mesa of the first structure in the second area, the second structure including an insulating layer, the insulating layer covering a surface of the second strip-shaped semiconductor region, and the first semiconductor mesa, the second semiconductor mesa, the first strip-shaped semiconductor region, and the second strip-shaped semiconductor region being arranged to constitute a first arm waveguide of the Mach-Zehnder modulator.

A method for fabricating a Mach-Zehnder modulator according to another aspect of the present invention includes: preparing an epitaxial substrate including a laminate and a substrate, the laminate including a semiconductor laminate for an upper waveguide structure and a semiconductor thick film for a lower waveguide structure, the semiconductor thick film being disposed on a first face of the semiconductor laminate, and the substrate mounting the laminate; forming a first strip-shaped groove and a second strip-shaped groove in the semiconductor thick film to form a semiconductor product; growing a first insulating film on the semiconductor product; preparing a supporting substrate having a principal surface including a first area, a second area, and a third area, the supporting substrate including a support and a second insulating film, and the second insulating film disposed on a principal surface of the support; carrying out bonding of the first insulating film of the semiconductor product and the second insulating film of the supporting substrate with each other to form a substrate product; removing the substrate from the substrate product to expose a second face of the semiconductor laminate; and after exposing the second face of the semiconductor laminate, processing the semiconductor laminate to form a first semiconductor mesa and a second semiconductor mesa for the upper waveguide structure, the substrate product including a strip-shaped void and a second strip-shaped void, and the bonding producing the strip-shaped void and the second strip-shaped void from the first strip-shaped groove and the second strip-shaped groove, respectively, the substrate product including a first strip-shaped semiconductor region and a second strip-shaped semiconductor region for the lower waveguide structure, and the strip-shaped void and the second strip-shaped void defining the first strip-shaped semiconductor region and the second strip-shaped semiconductor region, the first strip-shaped semiconductor region and the second strip-shaped semiconductor region being disposed on the second area and the third area, respectively, the first semiconductor mesa and the second semiconductor mesa being disposed on the first area and the second area, respectively, in the second area of the substrate product, the first strip-shaped semiconductor region being disposed between the second semiconductor mesa and the supporting substrate, and the first semiconductor mesa, the second semiconductor mesa, the first strip-shaped semiconductor region and the second strip-shaped semiconductor region being arranged to form a first arm waveguide of the Mach-Zehnder modulator.

BRIEF DESCRIPTION OF THE DRAWINGS

The above-described objects and the other objects, features, and advantages of the present invention become more apparent from the following detailed description of the preferred embodiments of the present invention proceeding with reference to the attached drawings.

DESCRIPTION OF THE EMBODIMENTS

Figure 1:
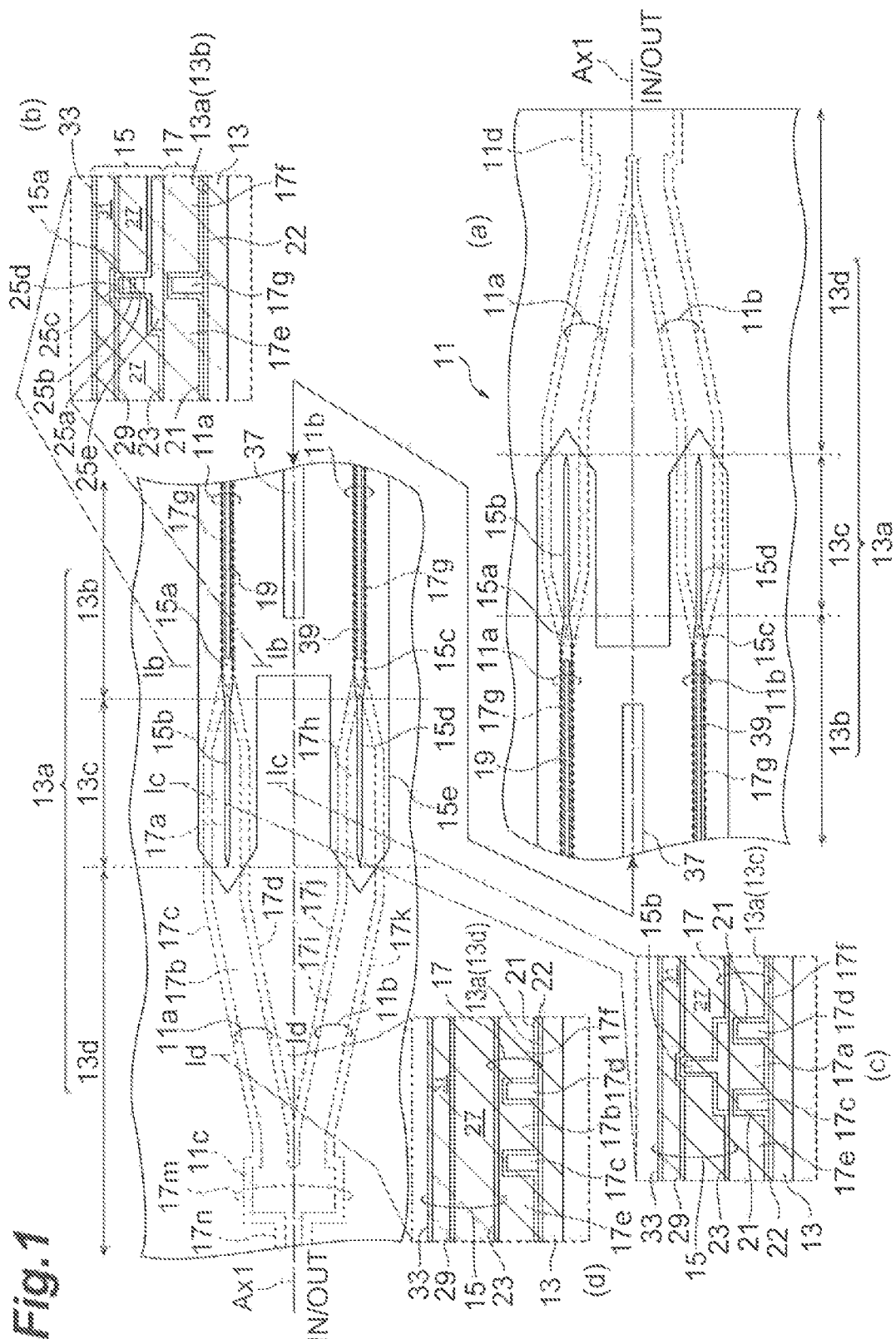
FIG. 1 is a schematic view showing a Mach-Zehnder modulator according to the present embodiment.

The Mach-Zehnder modulator includes an arm waveguide that receives an electrical signal for optical modulation. The arm waveguide has a laminate structure for optical confinement, which includes upper and lower semiconductor cladding layers and a core layer disposed therebetween. In order to apply the electrical signal to the core layer, the upper and lower semiconductor cladding layers are doped with p-type and n-type dopants, respectively, to have respective electrical conductivities opposite to each other in the arm waveguides. As such, the optical modulation requires the application of the electric signal to the semiconductor layers in the arm waveguide.

The Mach-Zehnder modulator includes not only an optical waveguide that receives electrical signals but also an optical waveguide that does not receive any electrical signal. Studies conducted by the inventors' reveal that the latter optical waveguide, which is free from the application of electric signals, may not be provided with a dedicated structure for optical confinement. What is needed is to provide the latter optical waveguide, which receives no electric signal, with a structure different from that of the former optical waveguide.

One aspect of the present invention is to provide a Mach-Zehnder modulator having one waveguide subjected to electrical-signal application and another waveguide free from electrical-signal application. Another aspect of the present invention is to provide a method for fabricating the Mach-Zehnder modulator.

Specific embodiments according to the present aspects will be described below.

A Mach-Zehnder modulator includes: (a) a support having a principal surface, the principal surface having a first area, a second area, and a third area; (b) a first structure disposed on the principal surface of the support, the first structure including a first semiconductor mesa and a second semiconductor mesa disposed on the first area and the second area, respectively; (c) a second structure disposed between the first structure and the principal surface of the support, the second structure including a first strip-shaped semiconductor region, a second strip-shaped semiconductor region, a first strip-shaped void, and a second strip-shaped void, the first strip-shaped semiconductor region and the second strip-shaped semiconductor region being disposed on the second area and the third area, respectively, and the first strip-shaped void and the second strip-shaped void defining the first strip-shaped semiconductor region and the second strip-shaped semiconductor region; (d) a first electrode disposed on the first semiconductor mesa in the first area and connected to the first semiconductor mesa, the first strip-shaped semiconductor region of the second structure being disposed between the support and the second semiconductor mesa of the first structure in the second area, the second structure including an insulating layer, the insulating layer covering a surface of the second strip-shaped semiconductor region, and the first semiconductor mesa, the second semiconductor mesa, the first strip-shaped semiconductor region, and the second strip-shaped semiconductor region being arranged to constitute a first arm waveguide of the Mach-Zehnder modulator.

The Mach-Zehnder modulator allows the first semiconductor mesa of the first arm waveguide in the first area to modulate an optical beam propagating therein in response to a modulation signal applied to the first electrode of the first arm waveguide, and has a stacking structure that includes the second semiconductor mesa and the first strip-shaped semiconductor region, which is disposed between the second semiconductor mesa and the substrate, and the stacking structure enables optical transitions from one of the semiconductor mesa and the first strip-shaped semiconductor region to the other. The first arm waveguide in the third area includes a second strip-shaped semiconductor region having a surface covered with an insulating layer, and combining the second strip-shaped semiconductor region with the insulating layers, which surrounds the second strip-shaped semiconductor region, makes a relative refractive index difference therebetween high. The high relative refractive index difference associated with the second strip-shaped semiconductor region makes it possible to confine a propagating optical beam into the second strip-shaped semiconductor region, and the optical confinement can reduce optical loss caused by the spread of the optical propagating optical beam.

In the Mach-Zehnder modulator according to an embodiment, each of the first semiconductor mesa and the second semiconductor mesa includes a first conductive-type semiconductor cladding layer, a core layer, and a second conductive-type semiconductor cladding layer, the second conductive-type semiconductor cladding layer, the core layer and the first conductive-type semiconductor cladding layer are sequentially arranged in a direction of an axis intersecting the principal surface of the support, the first strip-shaped semiconductor region and the second strip-shaped semiconductor region each include a high-specific resistance region having a higher specific resistance than that of the first conductive-type semiconductor cladding layer, and the first electrode is connected to the first conductive-type semiconductor cladding layer. The Mach-Zehnder modulator further includes an interconnect metal layer, the interconnect metal layer passing over the second strip-shaped semiconductor region of the second structure in the third area.

In the Mach-Zehnder modulator, the second strip-shaped semiconductor region of the second structure includes a high resistive semiconductor, and the interconnect metal layer extends over the second structure in the third area.

In the Mach-Zehnder modulator according to an embodiment, the high-specific resistance region includes at least one of undoped semiconductor or semiconductor doped with transition metal.

In the Mach-Zehnder modulator, the high resistive semiconductor includes at least one of an undoped semiconductor or a semiconductor doped transition metal, and these semiconductors exhibit small light absorption.

In the Mach-Zehnder modulator according an embodiment, the first structure includes a third semiconductor mesa and a fourth semiconductor mesa disposed on the first area and the second area, respectively, and the second structure includes a third strip-shaped semiconductor region, a fourth strip-shaped semiconductor region, a third strip-shaped void, and a fourth strip-shaped void, and a branching waveguide, the third strip-shaped semiconductor region and the fourth strip-shaped semiconductor region are disposed on the second area and the third area, the third strip-shaped void and the fourth strip-shaped void define the third strip-shaped semiconductor region and the fourth strip-shaped semiconductor region, and the third strip-shaped semiconductor region and the fourth strip-shaped semiconductor region join together at the branching waveguide.

In the Mach-Zehnder modulator, the branching waveguide may be disposed in the second structure.

The Mach-Zehnder modulator according to an embodiment further includes: a second electrode connected to a second arm waveguide of the Mach-Zehnder modulator, the second arm waveguide including the third semiconductor masa, the fourth semiconductor mesa, and the third strip-shaped semiconductor region, and the fourth strip-shaped semiconductor region; a first interconnect conductor connected to the first electrode; and a second interconnect conductor connected to the second electrode, the second interconnect conductor passing over the second strip-shaped semiconductor region of the second structure in the third area.

In the Mach-Zehnder modulator, the second strip-shaped semiconductor region of the second structure includes a high resistive semiconductor, and the second interconnect conductor extends over the second strip-shaped semiconductor region in the third area.

A method for fabricating a Mach-Zehnder modulator according to an embodiment includes: (a) preparing an epitaxial substrate including a laminate and a substrate, the laminate including a semiconductor laminate for an upper waveguide structure and a semiconductor thick film for a lower waveguide structure, the semiconductor thick film being disposed on a first face of the semiconductor laminate, and the substrate mounting the laminate; (b) forming a first strip-shaped groove and a second strip-shaped groove in the semiconductor thick film to form a semiconductor product; (c) growing a first insulating film on the semiconductor product; (d) preparing a supporting substrate having a principal surface with a first area, a second area, and a third area, the supporting substrate including a support and a second insulating film, and the second insulating film disposed on a principal surface of the support; (e) carrying out bonding of the first insulating film of the semiconductor product and the second insulating film of the supporting substrate with each other to form a substrate product; (f) removing the substrate from the substrate product to expose a second face of the semiconductor laminate; and (g) after exposing the second face of the semiconductor laminate, processing the semiconductor laminate to form a first semiconductor mesa and a second semiconductor mesa for the upper waveguide structure, the substrate product including a strip-shaped void and a second strip-shaped void, and the bonding producing the strip-shaped void and the second strip-shaped void from the first strip-shaped groove and the second strip-shaped groove, respectively, the substrate product including a first strip-shaped semiconductor region and a second strip-shaped semiconductor region for the lower waveguide structure, and the strip-shaped void and the second strip-shaped void defining the first strip-shaped semiconductor region and the second strip-shaped semiconductor region, the first strip-shaped semiconductor region and the second strip-shaped semiconductor region being disposed on the second area and the third area, respectively, the first semiconductor mesa and the second semiconductor mesa being disposed on the first area and the second area in the second area of the substrate product, respectively, the first strip-shaped semiconductor region being disposed between the second semiconductor mesa and the supporting substrate, and the first semiconductor mesa, the second semiconductor mesa, the first strip-shaped semiconductor region and the second strip-shaped semiconductor region being arranged to form a first arm waveguide of the Mach-Zehnder modulator.

In the method for fabricating the Mach-Zehnder modulator, the first strip-shaped groove and the second strip-shaped groove are formed in the semiconductor thick film, which is disposed on the first face of the first semiconductor laminate of the epitaxial substrate, and the first insulating film is grown on the thick semiconductor film of the semiconductor product having the first and second strip-shaped grooves. The first insulating film of the semiconductor product and the second insulating film of the supporting substrate are bonded to each other to prepare a substrate product. This bonding produces a first strip-shaped void and a second strip-shaped void from the first strip-shaped groove and the second strip-shaped groove, respectively, thereby providing a substrate product. In the substrate product, the first strip-shaped void and the second strip-shaped void defines the first strip-shaped semiconductor region and the second strip-shaped semiconductor region for the lower waveguide structure. The substrate product is processed to remove the substrate therefrom, and the removal causes the second face (the face opposite the first face) of the semiconductor laminate to appear. The exposed first semiconductor laminate is processed to form a first semiconductor mesa and a second semiconductor mesa for the upper waveguide structure. The first semiconductor mesa and the second semiconductor mesa are formed for the upper waveguide structure, and the first strip-shaped semiconductor region and the second strip-shaped semiconductor region are formed for the lower waveguide structure. In the second area of the substrate product, a first strip-shaped semiconductor region is disposed between the second semiconductor mesa and the supporting substrate to form an arrangement of the second semiconductor mesa, the first strip-shaped semiconductor region and the supporting substrate, and this arrangement allows optical transition therebetween.

Teachings of the present invention can be readily understood by considering the following detailed description with reference to the accompanying drawings shown as examples. Referring to the accompanying drawings, embodiments of a Mach-Zehnder modulator and a method for fabricating a Mach-Zehnder modulator according to the present invention will be described. To facilitate understanding, identical reference numerals are used, where possible, to designate identical elements that are common to the figures.

FIG. 1 is a schematic view showing a Mach-Zehnder modulator according to the present embodiment. The Mach-Zehnder modulator 11 includes a first arm waveguide 11a, a second arm waveguide 11b, a first branching waveguide 11c, and a second branching waveguide 11d. The first arm waveguide 11a and the second arm waveguide 11b are connected to the first branching waveguide 11c and connected to the second branching waveguide 11d. One of the first and second branching waveguides 11c and 11d serves as a multiplexer and the other serves as a demultiplexer.

The structure of the first arm waveguide 11a of the Mach-Zehnder modulator 11 will be described below. The following description can be, however, applied to the second arm waveguide 11b of the Mach-Zehnder modulator 11. The Mach-Zehnder modulator 11 includes a support base 13, a first structure 15, a second structure 17, and a first electrode 19. The support base 13 has a principal surface 13a, which includes a first area 13b, a second area 13c, and a third area 13d. The first area 13b, the second area 13c, and the third area 13d are sequentially arranged in the direction of a first axis Ax1. In the present embodiment, the second area 13c is in contact with the first area 13b and the third area 13d. The supporting substrate 13 includes an insulating film (for example, a silicon oxide film) that provides the principal surface 13a. The first structure 15 and the second structure 17 are provided on the principal surface 13a of the support base 13, and the second structure 17 is provided between the first structure 15 and the principal surface 13a of the support base 13. In the present embodiment, the second structure 17 is bonded to the support base 13, and the Mach-Zehnder modulator 11 includes a bonding interface. The part (a) in FIG. 1 is a plan view drawing structural objects of the first structure 15 by a solid line and structural objects of the second structure 17 by a broken line in order to show the hierarchy thereof. The part (b) of FIG. 1 is a cross sectional view taken along the line Ib-Ib shown in the part (a) of FIG. 1; the part (c) of FIG. 1 is a cross sectional view taken along the line Ic-Ic shown in the part (a) of FIG. 1; and the part (d) of FIG. 1 is a cross sectional view taken along the line Id-Id shown in the part (a) of FIG. 1.

The first structure 15 includes a first semiconductor mesa 15a and a second semiconductor mesa 15b, which are provided on the first area 13b and the second area 13c, respectively. The first semiconductor mesa 15a and the second semiconductor mesa 15b are connected to each other. The first electrode 19 is disposed on the first semiconductor mesa 15a in the first area 13b, and connected to the top face of the first semiconductor mesa 15a.

The second structure 17 includes a first strip-shaped semiconductor region 17a, a second strip-shaped semiconductor region 17b, a first strip-shaped void 17c and a second strip-shaped void 17d. The first strip-shaped semiconductor region 17a and the second strip-shaped semiconductor region 17b are disposed on the second area 13c and the third area 13d, respectively. The first strip-shaped semiconductor region 17a and the second strip-shaped semiconductor region 17b are connected to each other.

The first strip-shaped void 17c and the second strip-shaped void 17d are disposed on the second area 13c and the third area 13d, respectively, to define the first strip-shaped semiconductor region 17a and the second strip-shaped semiconductor region 17b. The second structure 17 includes a first insulating layer 21 that covers the surface of the second strip-shaped semiconductor region 17b. For example, in the second area 13c, the first strip-shaped void 17c and the second strip-shaped void 17d extend in the direction of the first axis Ax1, and these extensions can form the first strip-shaped semiconductor region 17a acting as the core of the lower waveguide structure. The first insulating layer 21 covers the side and bottom faces of the first and second strip-shaped voids 17c and 17d. The first strip-shaped void 17c, the second strip-shaped void 17d and the first insulating layer 21 constitute the cladding of the lower waveguide structure. The first insulating layer 21 forms a junction with the principal surface 13a (which is made of the second insulating layer 22).

The second structure 17 includes a first support region 17e and a second support region 17f. The first strip-shaped void 17c is defined by the first support region 17e and the first and second strip-shaped semiconductor regions 17a and 17b, and the second strip-shaped void 17d is defined by the second support region 17f and the first and second strip-shaped semiconductor regions 17a and 17b.

In the first area 13b, the first structure 15 includes a first semiconductor mesa 15a, and the second structure 17 includes a fifth strip-shaped void 17g disposed between the first semiconductor mesa 15a and the principal surface of the support base 13. The fifth strip-shaped void 17g is defined by the first support region 17e and the second support region 17f. The first strip-shaped void 17c and the second strip-shaped void 17d join together to form a single void, referred to as the fifth strip-shaped void 17g, which is formed by the confluence thereof. The fifth strip-shaped void 17g works as a lower cladding region for the first semiconductor mesa 15a, and prevents transmission light from seeping out from the first semiconductor mesa 15a to the second structure 17. The fifth strip-shaped void 17g can provide the first structure 15 with the stable propagation of light.

In the second area 13c, the first strip-shaped semiconductor region 17a of the second structure 17 is disposed between the second semiconductor mesa 15b of the first structure 15 and the principal surface 13a of the support base 13. The second semiconductor mesa 15b, the first strip-shaped semiconductor region 17a, and the support base 13 are arranged in the direction normal to the principal surface 13a of the support base 13. This stacking arrangement allows the first strip-shaped semiconductor region 17a and the second semiconductor mesa 15b to be optically coupled to each other. This optical coupling enables optical transitions from one of the first strip-shaped semiconductor region 17a and the second semiconductor mesa 15b to the other. In addition, in the second area 13c, the second semiconductor mesa 15b terminates, and the first strip-shaped semiconductor region 17a also terminates. These terminations and the stacking arrangement enable stable transitions of light between the first strip-shaped semiconductor region 17a and the second semiconductor mesa 15b. The stable transitions of light ensure traveling from one of the first strip-shaped semiconductor region 17a and the second semiconductor mesa 15b to the other without the occurrence of returning light. The termination of the second semiconductor mesa 15b can be achieved by providing the second semiconductor mesa 15b with a tapered end, which has a width gradually narrowing in the direction thereof. The termination end of the first strip-shaped semiconductor region 17a can be achieved by providing the first strip-shaped semiconductor region 17a with a tapered end, which has a gradually narrowing width defined as the interval between the first strip-shaped void 17c and the second strip-shaped void 17d. The narrowing of the interval allows the first strip-shaped void 17c and the second strip-shaped void 17d to finally join together. In the present embodiment, the second semiconductor mesa 15b has a smaller width than that of the first semiconductor mesa 15a, and has a tip portion, which gradually narrows in the direction from the second area 13c to the third area 13d to enable the termination of the second semiconductor mesa 15b. The first semiconductor mesa 15a and the second semiconductor mesa 15b are connected to each other via a tapered waveguide therebetween.

In the third area 13d, the first insulating layer 21 covers the top and side faces of the first and second support regions 17e and 17f, and the side faces of the second strip-shaped semiconductor region 17b (the surfaces of the first and second strip-shaped voids 17c and 17d), and the third insulating layer 23 covers the back faces of the first and second support region 17e and 17f, and the back face of the second strip-shaped semiconductor region 17b. The surface of the second strip-shaped semiconductor region 17b is covered with the first and third insulating layers 21 and 23. The coatings allow the second strip-shaped semiconductor region 17b to enable a stable propagation of light.

As understood from the above description, the Mach-Zehnder modulator 11 provides the first arm waveguide 11a with the first semiconductor mesa 15a, the second semiconductor mesa 15b, the first strip-shaped semiconductor region 17a, and the second strip-shaped semiconductor region 17b, and provides the second arm waveguide 11b with a third semiconductor mesa 15c, a fourth semiconductor mesa 15d, a third strip-shaped semiconductor region 17h, and a fourth strip-shaped semiconductor region 17i. The second structure 17 includes the first and second branching waveguides 11c and 11d, each of which includes a branching waveguide 17m.

The Mach-Zehnder modulator 11 allows the first semiconductor mesa 15a of the first arm waveguide 11a in the first area 13b to modulate the waveguide light in response to the modulation signal from the first electrode 19. In the second area 13c, the first strip-shaped semiconductor region 17a is disposed between the second semiconductor mesa 15b and the support base 13 to form a stacking arrangement of the first strip-shaped semiconductor region 17a and the second semiconductor mesa 15b. This stacking arrangement enables transitions of light from one of the first strip-shaped semiconductor region 17a and the second semiconductor mesa 15b to the other. In the third area 13d, the first arm waveguide 11a includes the second strip-shaped semiconductor region 17b, the surface of which is covered with the first insulating layer 21 and the third insulating layer 23. Combining the second strip-shaped semiconductor region 17b with the first insulating layer 21 and the second insulating layer 22, which cover the second strip-shaped semiconductor region 17b, makes relative refractive index difference between the second strip-shaped semiconductor region 17b and the first and third insulating layers 21 and 23 high. This high relative refractive index difference makes it possible to confine the waveguide light into the second strip-shaped semiconductor region 17b, and to reduce optical loss caused by spreading of the waveguide light.

The first and second semiconductor mesas 15a and 15b each include a lower cladding layer 25a, a core layer 25b, and an upper cladding layer 25c, and further includes a conductive upper contact layer 25d and/or a conductive lower contact layer 25e. In the present embodiment, the lower contact layer 25e, the lower cladding layer 25a, the core layer 25b, the upper cladding layer 25c, and the upper contact layer 25d are sequentially arranged in the direction normal to the principal surface 13a of the support base 13.

In order to enable the application of voltage to the arm waveguides, the lower cladding layer 25a comprises a semiconductor of a first conductivity type, for example, an n-type semiconductor, and the upper cladding layer 25c comprises a semiconductor of a second conductivity type, for example, a p-type semiconductor. The upper contact layer 25d includes a p-type semiconductor, and the lower contact layer 25e includes an n-type semiconductor. The core layer 25b has, for example, a quantum well structure and can include an undoped semiconductor. The first structure 15 and the second structure 17 each include an isolation mesa 15e for electrical insulation of the Mach-Zehnder modulator 11 in the first and second areas 13b and 13c. The isolation mesa 15e may comprise, for example, a lower cladding layer 25a or a lower contact layer 25e. In the first area 13b, the second electrode 37 is connected to the isolation mesa 15e. In the present embodiment, the isolation mesa 15e includes the lower contact layer 25e, and the first electrode 19 is connected to the upper contact layer 25d of the first semiconductor mesa 15a.

The first and second strip-shaped semiconductor regions 17a and 17b of the second structure 17 are provided with a high resistive semiconductor. This high resistive semiconductor has a specific resistance higher than specific resistances of the lower cladding layer 25a and the upper cladding layer 25c. The high resistive semiconductor may comprise at least one of an undoped semiconductor and a semiconductor doped with transition metal. Such a high resistive semiconductor, which can be made of the undoped or the metal-doped semiconductor, exhibits small absorption of light.

The Mach-Zehnder modulator 11 includes a first resin body 27, which includes, for example, a benzocyclobutene (BCB) resin. In addition, a fourth insulating film 29 is disposed on the first resin body 27. The first resin body 27 embeds the first semiconductor mesa 15a and the second semiconductor mesa 15b, which are in the first area 13b and the second area 13c, respectively. In the third area 13d, the first resin body 27 is provided on the second structure 17. The Mach-Zehnder modulator 11 includes a second resin body 31, which includes, for example, a benzocyclobutene (BCB) resin. Furthermore, a fifth insulating film 33 may be provided on the second resin body 31.

An exemplary Mach-Zehnder modulator 11.
Lower cladding layer 25a: n-type InP, 0.5 micrometer thick.
Core layer 25b: multiple quantum well structure of undoped AlGaInAs, 0.5 micrometer thick.
Upper cladding layer 25c: p-type InP, 1.5 micrometer thick.
Upper contact layer 25d: p+type InGaAs, 0.2 micrometer thick.
Lower contact layer 25e: n+type InP, 1 micrometer thick.
First insulating layer 21: silicon-based inorganic insulating film, for example, silicon oxide.
Thickness of the first insulating layer 21: 200 to 600 nanometers.
Third insulating layer 23: silicon-based inorganic insulating film, for example, silicon oxide.
Thickness of the third insulating layer 23: 100 to 400 nanometers.
First and second strip-shaped semiconductor regions 17a and 17b: Fe-doped InP.
Thickness of the strip-shaped semiconductor region: 3 to 6 micrometers.
Width of the strip-shaped semiconductor region: 3 to 6 micrometers.
Width of strip-shaped void: 1 to 5 micrometers.
Depth of strip-shaped void: 2 to 6 micrometers.
Fourth insulating film 29: silicon-based inorganic insulating material, for example, silicon oxide.
Thickness of the fourth insulating film 29: 300 nanometers.
Fifth insulating film 33: silicon-based inorganic insulating material, for example, silicon oxynitride.
Thickness of the fifth insulating film 33: 400 nanometers.
Support base 13: GaAs or InP.
Second insulating layer 22: silicon-based inorganic insulating film, for example, silicon oxide.
Thickness of the second insulating layer 22: 100 to 400 nanometers.

The width of the first strip-shaped semiconductor region 17a is larger than that of the first semiconductor mesa 15a. The thickness of the second strip-shaped semiconductor region 17b is larger than the height of the first semiconductor mesa 15a.

The second arm waveguide 11b of the Mach-Zehnder modulator 11 may include substantially the same structure as the first arm waveguide 11a. The specific structure thereof is as follows.

The first structure 15 includes the third and fourth semiconductor mesas 15c and 15d, which are provided on the first and second areas 13b and 13c, respectively. In the present embodiment, the third and fourth semiconductor mesas 15c and 15d in the second arm waveguide 11b correspond to the first and second semiconductor mesas 15a and 15b in the first arm waveguide 11a, respectively, and the structures of the third and fourth semiconductor mesas 15c and 15d have substantially the same as those of the first and second semiconductor mesas 15a and 15b, respectively.

The second structure 17 also includes the third strip-shaped semiconductor region 17h and the fourth strip-shaped semiconductor region 17i, and further include a third strip-shaped void 17j and a fourth strip-shaped void 17k. The third and fourth strip-shaped semiconductor regions 17h and 17i are disposed on the second and third areas 13c and 13d, respectively. The second structure 17 further includes the branching waveguide 17m, which is provided on the third area 13d to join the second strip-shaped semiconductor region 17b and the fourth strip-shaped semiconductor region 17i. The confluence of the second strip-shaped semiconductor region 17b and the fourth strip-shaped semiconductor region 17i result in the confluence of the second strip-shaped void 17d and the third strip-shaped void 17j. The first strip-shaped void 17c and the fourth strip-shaped void 17k define the branching waveguide 17m and a waveguide 17n that is connected to the branching waveguide 17m. In the present embodiment, the third strip-shaped semiconductor region 17h and the fourth strip-shaped semiconductor region 17i in the second arm waveguide 11b correspond to the first strip-shaped semiconductor region 17a and the second strip-shaped semiconductor region 17b in the first arm waveguide 11a, respectively, the structures of which are substantially the same as those of the third strip-shaped semiconductor region 17h and the fourth strip-shaped semiconductor region 17i. The third strip-shaped void 17j and the fourth strip-shaped void 17k correspond to the first strip-shaped void 17c and the second strip-shaped void 17d, respectively, the structures of which are substantially the same as those of the third strip-shaped void 17j and the fourth strip-shaped void 17k.

In the Mach-Zehnder modulator, the second arm waveguide 11b includes the third semiconductor mesa 15c, the fourth semiconductor mesa 15d, the third strip-shaped semiconductor region 17h, and the fourth strip-shaped semiconductor region 17i.

Figure 2:
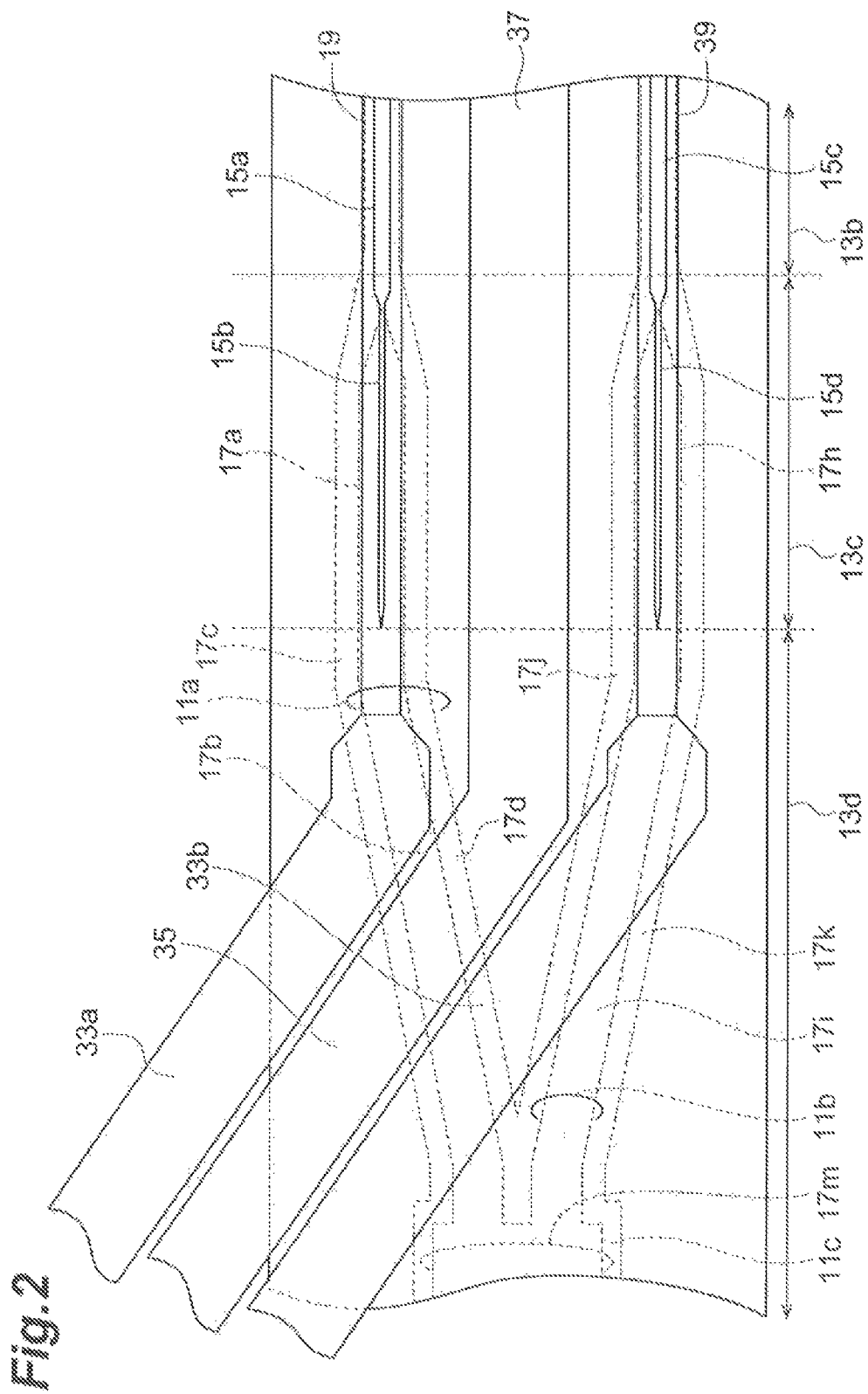
FIG. 2 is a view showing the arrangement of interconnect metal layers for the first arm waveguide and the second arm waveguide of the Mach-Zehnder modulator according to the present embodiment.
Figure 3A:
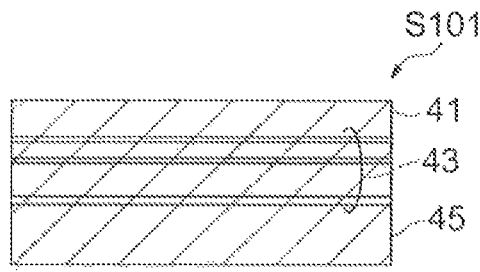
FIGS. 3A to 3E are schematic views showing a major step in the method for fabricating the Mach-Zehnder modulator according to the present embodiment.
Figure 3B:
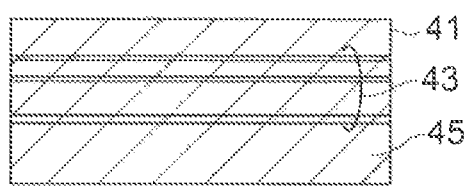
Figure 3C:
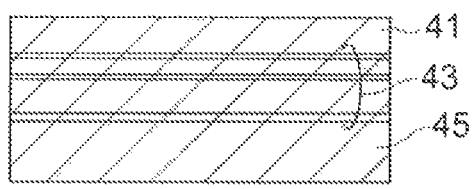
Figure 3D:
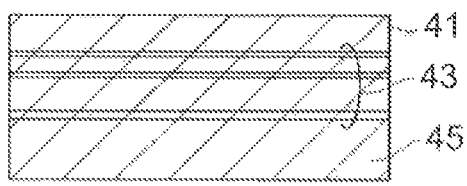
Figure 3E:
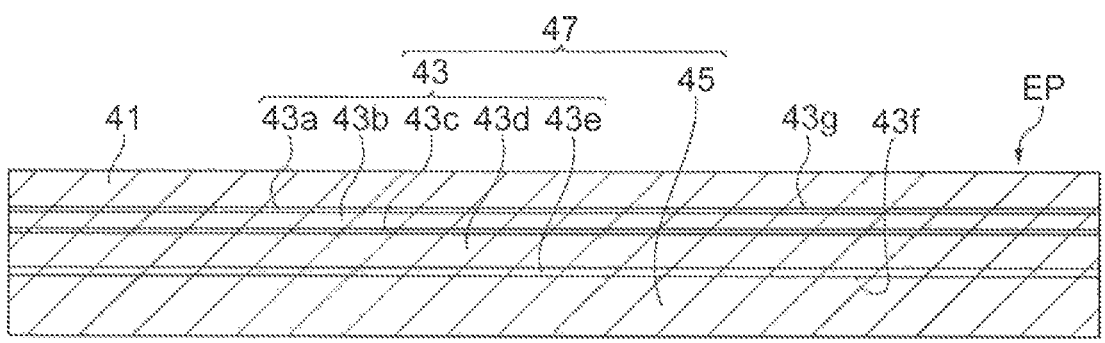

FIG. 2 is a view showing the arrangement of interconnect metal layers for the first arm waveguide and the second arm waveguide of the Mach-Zehnder modulator. The Mach-Zehnder modulator 11 includes a first interconnect conductor 33a, a second interconnect conductor 35, and a third interconnect conductor 33b. The first interconnect conductor 33a is connected to the first electrode 19. The second interconnect conductor 35 is connected to the second electrode 37. The third interconnect conductor 33b is connected to a third electrode 39, which is connected to the third semiconductor mesa 15c of the second arm waveguide 11b. The first interconnect conductor 33a, the second interconnect conductor 35, and the third interconnect conductor 33b extend on the first resin body 27 and the second resin body 31 in the third area 13d. The first resin body 27 and the second resin body 31 can separate the third interconnect conductor 33b apart from the first arm waveguide 11a. Further, in the third area 13d, the second strip-shaped semiconductor region 17b includes semiconductor of a high specific resistance that can reduce the capacitive coupling between the third interconnect conductor 33b and the first arm waveguide 11a.

Referring to FIG. 1, the single Mach-Zehnder modulator 11 is connected to one of the input port IN and the output port OUT. The waveguide structure according to the present embodiment can be used to form an integrated device with Mach-Zehnder modulators. In the second structure 17, the Mach-Zehnder modulator 11 of FIG. 1 has the branching waveguides, either one of which can be disposed in the first structure 15.

Major steps in the method of fabricating a Mach-Zehnder modulator will be described with reference to FIGS. 3A to 3E, 4A to 4E, 5A to 5E, 6A to 6E, 7A to 7E, 8A to 8E, 9A to 9E, 10A to 10E, 11A to 11E, 12A to 12E, and 13A to 13E. FIGS. 3A to 13A are cross sectional views, taken in the first area 13b of the Mach-Zehnder modulator 11 to be fabricated, each showing the progress of a product in a major step in the method for fabricating the Mach-Zehnder modulator 11. FIGS. 3B to 13B are cross sectional views, taken in the second area 13c of the Mach-Zehnder modulator 11 to be fabricated, each showing the progress of a product in a major step in the method for fabricating the Mach-Zehnder modulator 11. FIGS. 3C to 13C are cross sectional views, taken in the third area 13d of the Mach-Zehnder modulator 11 to be fabricated, each showing the progress of a product in a major step in the method for fabricating the Mach-Zehnder modulator 11. FIGS. 3D to 13D are cross sectional views, taken in the I/O area including input and output ports of the Mach-Zehnder modulator 11 to be fabricated, each showing the progress of a product in a major step in the method for fabricating the Mach-Zehnder modulator 11. FIGS. 3E to 13E are cross sectional views, taken in the first area 13b in which the first and second arm waveguides of the Mach-Zehnder modulator 11 to be fabricated, each showing the progress of a product in a major step in the method for fabricating the Mach-Zehnder modulator 11. For easy understanding, the following description will use reference numerals labeled to corresponding parts of the Mach-Zehnder modulator 11, where possible.

As shown in FIGS. 3A to 3E, an epitaxial substrate EP is prepared in step S101. In the present embodiment, in order to prepare the epitaxial substrate EP, the epitaxial substrate EP is fabricated. A first semiconductor laminate 43 for an upper waveguide structure and a semiconductor thick film 45 for a lower waveguide structure are epitaxially grown on a growth substrate 41. Specifically, a first semiconductor layer 43a, a second semiconductor layer 43b, a third semiconductor layer 43c, a fourth semiconductor layer 43d, and a fifth semiconductor layer 43e, which are associated with the lower cladding layer 25a, the core layer 25b, the upper cladding layer 25c, the upper contact layer 25d, and the lower contact layer 25e, respectively, are grown on the growth substrate 41 by a metal-organic vapor phase epitaxy method to form a first semiconductor laminate 43, and then a semiconductor thick film 45 is grown on the first face 43f of the first semiconductor laminate 43. The first semiconductor laminate 43 and the semiconductor thick film 45 constitute the laminate 47, which the growth substrate 41 mounts thereon. The growth substrate 41 includes, for example, InP.

An exemplary epitaxial film.
First semiconductor layer 43a: p-InGaAs.
Second semiconductor layer 43b: p-InP.
Third semiconductor layer 43c: InGaAsP or AlGaInAs quantum well (MQW).
Fourth semiconductor layer 43d: n-InP.

Fifth semiconductor layer 43e: n+-InP.
Growth substrate 41: InP.
Semiconductor thick film 45: Fe-doped InP and/or undoped GaInAsP.

Figure 4A:
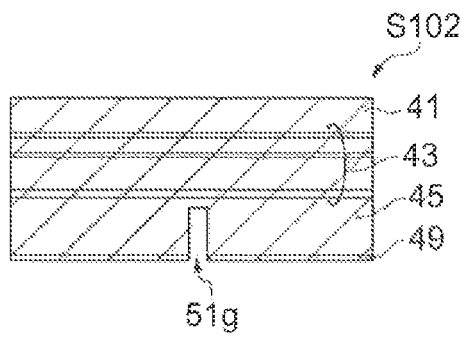
FIGS. 4A to 4E are schematic views showing a major step in the method for fabricating the Mach-Zehnder modulator according to the present embodiment.
Figure 4B:
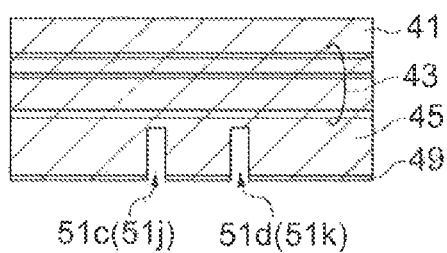
Figure 4C:
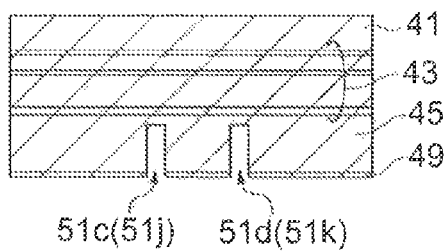
Figure 4D:
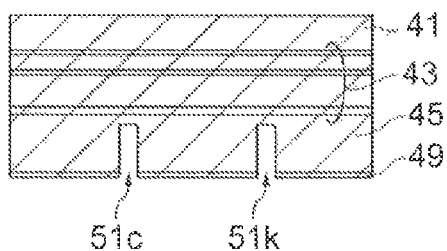
Figure 4E:
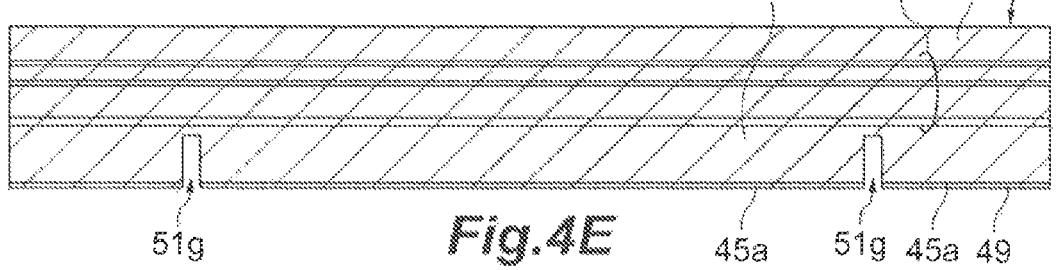
Figure 5A:
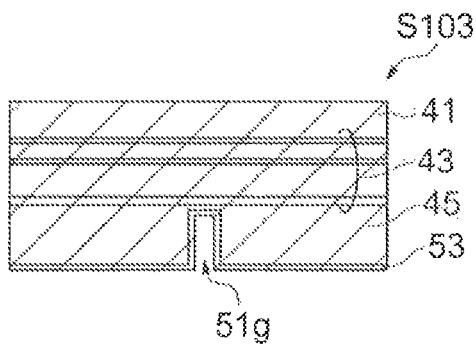
FIGS. 5A to 5E are schematic views showing a major step in the method for fabricating the Mach-Zehnder modulator according to the present embodiment.
Figure 5B:
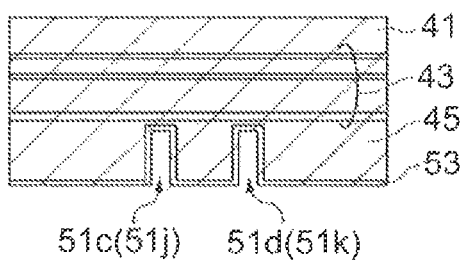
Figure 5C:
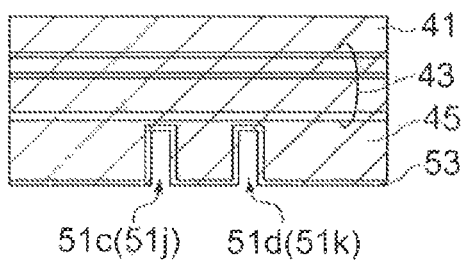
Figure 5D:
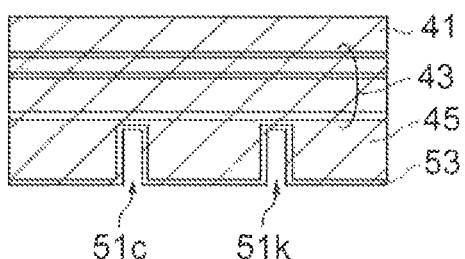
Figure 5E:
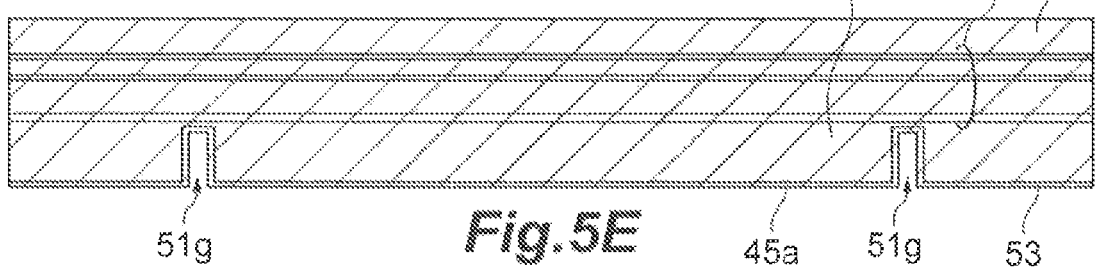
Figure 6A:
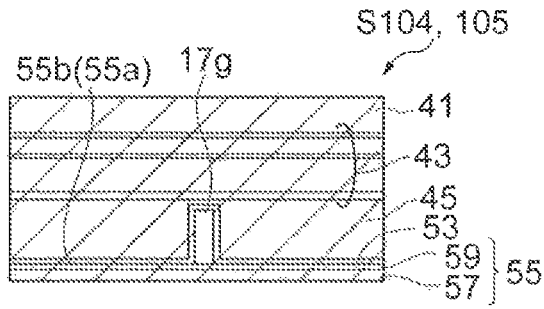
FIGS. 6A to 6E are schematic views showing a major step in the method for fabricating the Mach-Zehnder modulator according to the present embodiment.
Figure 6B:
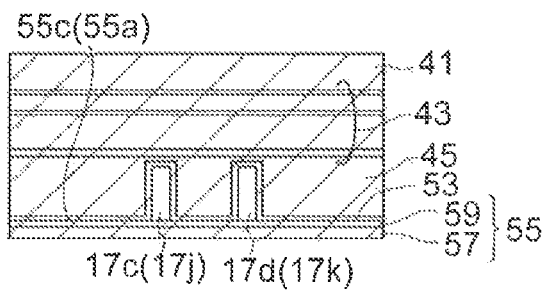
Figure 6C:
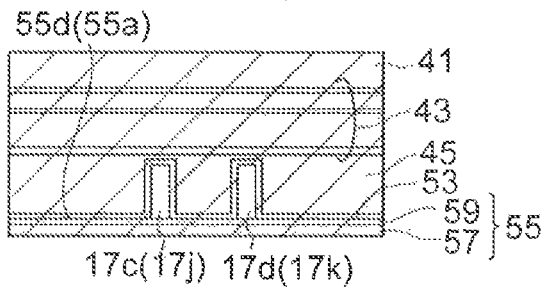
Figure 6D:
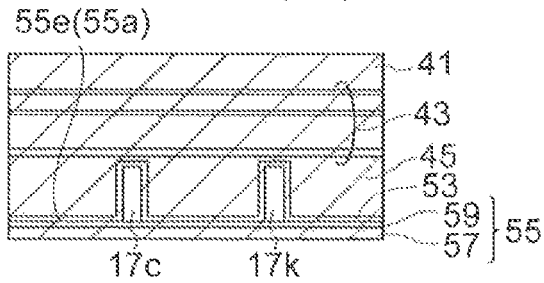
Figure 6E:
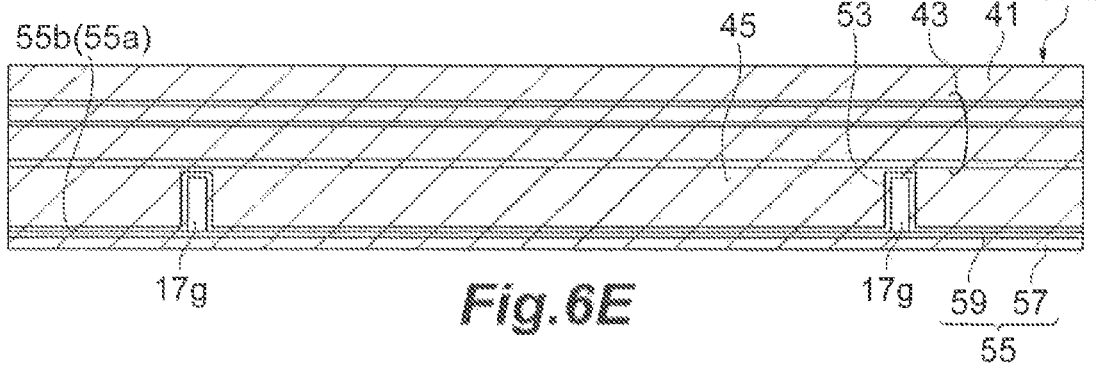
Figure 7A:
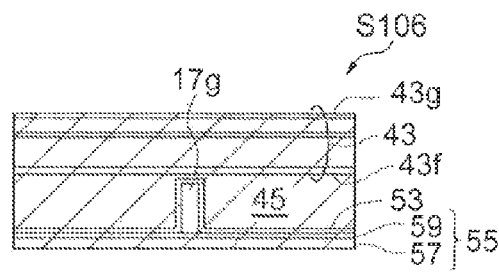
FIGS. 7A to 7E are schematic views showing a major step in the method for fabricating the Mach-Zehnder modulator according to the present embodiment.
Figure 7B:
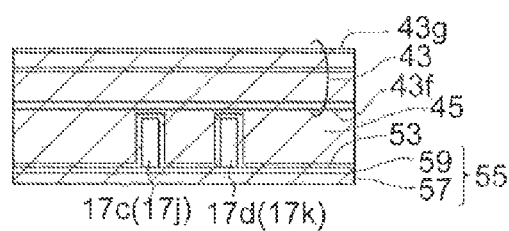
Figure 7C:
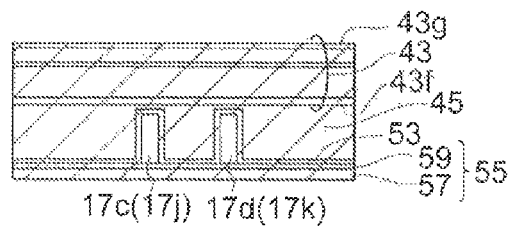
Figure 7D:
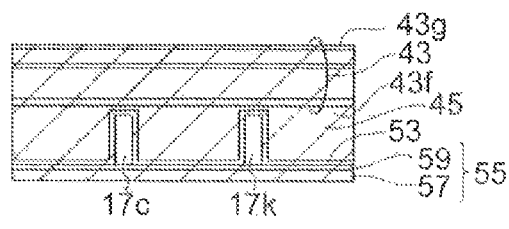
Figure 7E:
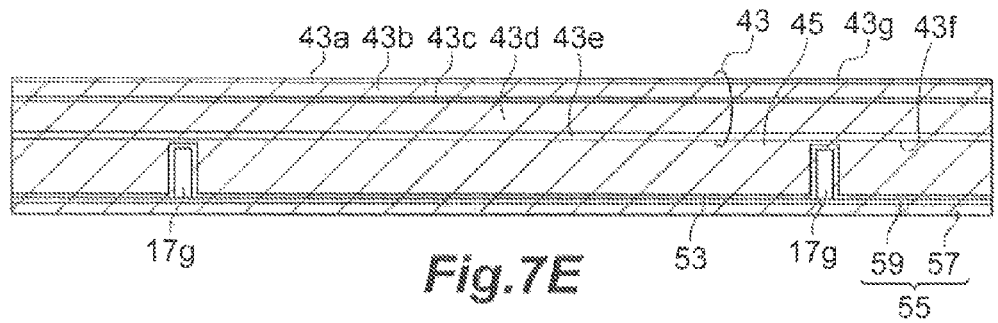

In step S102, as shown in FIGS. 4A to 4E, the semiconductor thick film 45 is processed to form grooves for strip-shaped voids, and the grooves each have a bottom in the semiconductor thick film 45. Specifically, a mask 49 (for example, an SiN mask) defining a pattern for the grooves is formed on the principal surface 45a of the semiconductor thick film 45, and the semiconductor thick film 45 is etched with the mask 49 to form a first strip-shaped groove 51c (a third strip-shaped groove 51j), a second strip-shaped groove 51d (a fourth strip-shaped groove 51k), and a fifth strip-shaped groove 51g. As shown in FIGS. 4A and 4E, the fifth strip-shaped groove 51g for the fifth strip-shaped void 17g is formed in the first area 13b. As shown in FIGS. 4A and 4C, the first strip-shaped groove 51c (51j) for the first strip-shaped void 17c (17j) and the second strip-shaped groove 51d (51k) for the second strip-shaped void 17d (17k) are formed in the second area 13c and the third area 13d, respectively. As shown in FIG. 4D, the first strip-shaped groove 51c for the first strip-shaped void 17c and the fourth strip-shaped groove 51k for the fourth strip-shaped void 17k are formed in the I/O area. After the etching, the mask 49 is removed to obtain a semiconductor product SP1.

In step S103, as shown in FIGS. 5A to 5E, after the grooves are formed in the semiconductor thick film 45, a first dielectric film 53 is grown over the semiconductor product SP1. Specifically, the first dielectric film 53 is formed to cover the principal surface 45a of the semiconductor thick film 45, the side and bottom faces of the first strip-shaped groove 51c (the third strip-shaped groove 51j), and the side and bottom faces of the second strip-shaped groove 51d (the fourth strip-shaped groove 51k) and the fifth strip-shaped groove 51g. The first dielectric film 53 may include, for example, a silicon-based inorganic insulating film, and the silicon-based inorganic insulating film is deposited by, for example, a vapor phase growth method.

As shown in of FIGS. 6A to 6E, the support base 55 is prepared in step S104. The support base 55 includes a support 57 and a second dielectric film 59, which is provided on the principal surface of the support 57. The principal surface 55a of the support base 55 includes a first area 55b, a second area 55c, a third area 55d, and an I/O area 55e. Preferably, the support base 55 is made of a material having the same cleavage property as the growth substrate 41. The support base 55 includes, for example, InP or GaAs.

As shown in FIGS. 6A to 6E, in the step S105, the first dielectric film 53 of the semiconductor product SP1 and the second dielectric film 59 of the support base 55 are bonded to each other to form a junction, thereby obtaining a substrate product SP2. Specifically, the first dielectric film 53 of the semiconductor product SP1 is rinsed with purified water and then subjected to plasma treatment. The second dielectric film 59 of the support base 55 is also rinsed with purified water and then subjected to plasma treatment. After these processes, the first dielectric film 53 of the semiconductor product SP1 and the second dielectric film 59 of the support base 55 are brought into contact in a vacuum to join the first dielectric film 53 and the second dielectric film 59 to each other, thereby forming the junction therebetween. The bonding can produce the first strip-shaped void 17c, the second strip-shaped void 17d, the third strip-shaped void 17j, the fourth strip-shaped void 17k, and the fifth strip-shaped void 17g from the first strip-shaped groove 51c, the second strip-shaped groove 51d, the third strip-shaped groove 51j, the fourth strip-shaped groove 51k, and the fifth strip-shaped groove 51g. This bonding may follow the alignment of crystal axes of the semiconductor product SP1 and the support base 55.

As shown in FIGS. 7A to 7E, in step S106, the growth substrate 41 is removed from the substrate product SP2, so that the second surface 43g of the first semiconductor laminate 43 (the surface opposite to the first surface 43f of the first semiconductor laminate 43) appears. Specifically, the growth substrate 41 made of InP can be removed by wet etching with hydrochloric acid. In order to use the wet etching, the first semiconductor layer 43a is preferably made of a semiconductor, such as InGaAs, which has a high etching resistance to an etchant (for example, hydrochloric acid). In processing the substrate product SP2 which includes the supporting substrate 55 made of a semiconductor, such as InP, having less etching resistance to the above etchant (for example, hydrochloric acid), the back face of the substrate product SP2 (the back face of the growth substrate 41 providing the front face of the substrate product SP2) should be covered with a protective layer (for example, resist).

If necessary, as shown in FIGS. 8A to 8E, in step S107, the first semiconductor layer 43a (for example, p-type InGaAs) for the upper contact layer 25d can be preliminarily patterned with a first mask 61, which has a pattern allowing the upper contact layer 25d to be left in the modulating portion of the arm waveguide. Etching with the first mask 61 is carried out to form the patterned first semiconductor layer 43h in the modulating portion, so that the second semiconductor layer 43b (the upper cladding layer 25c) appears in the remaining area. This etching process provides a second semiconductor laminate 63.

Figure 8A:
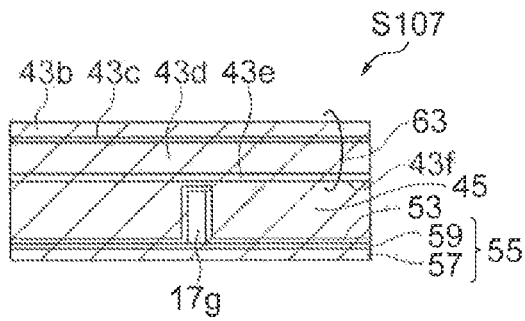
FIGS. 8A to 8E are schematic views showing a major step in the method for fabricating the Mach-Zehnder modulator according to the present embodiment.
Figure 8B:
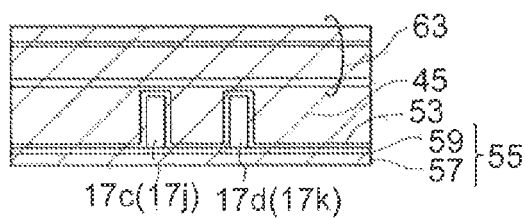
Figure 8C:
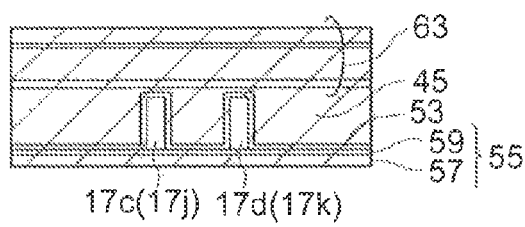
Figure 8D:
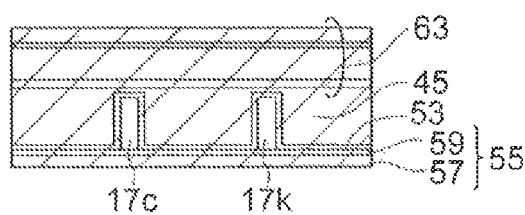
Figure 8E:
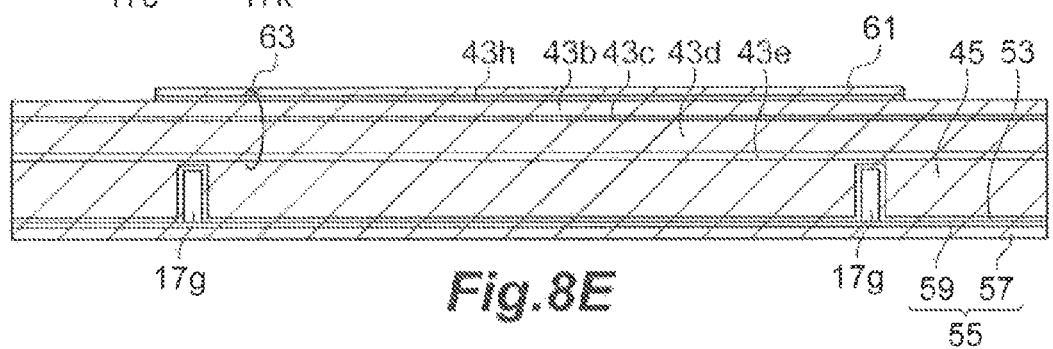
Figure 9A:
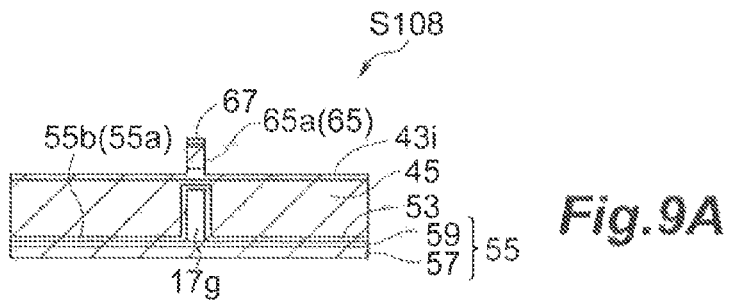
FIGS. 9A to 9E are schematic views showing a major step in the method for fabricating the Mach-Zehnder modulator according to the present embodiment.
Figure 9B:
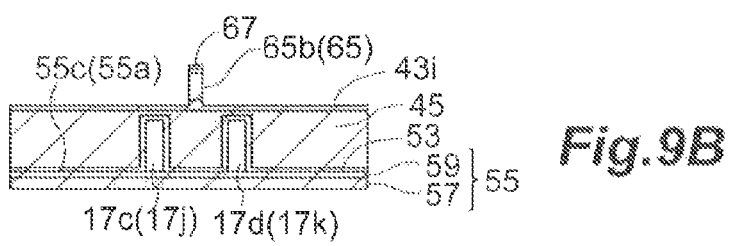
Figure 9C:
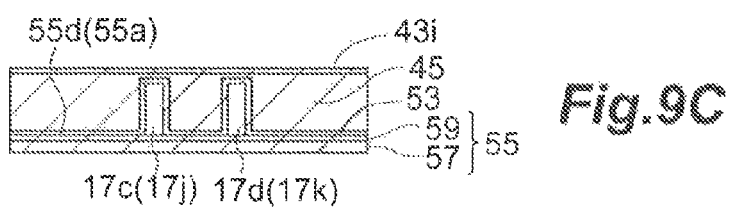
Figure 9D:
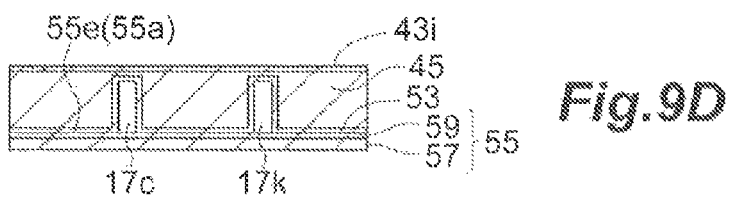
Figure 9E:
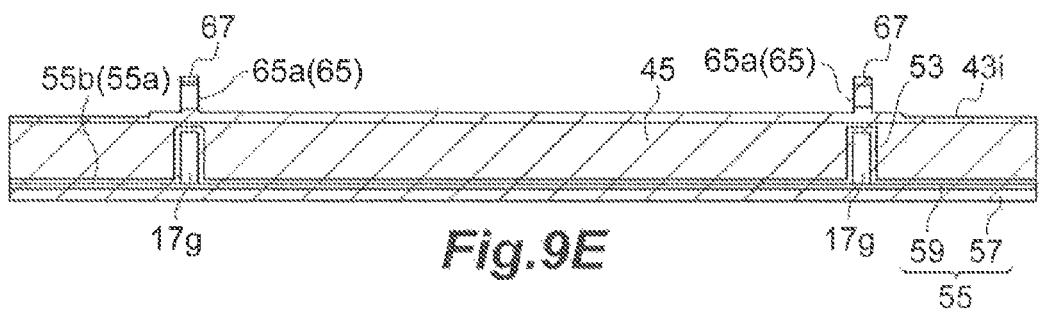
Figure 10A:
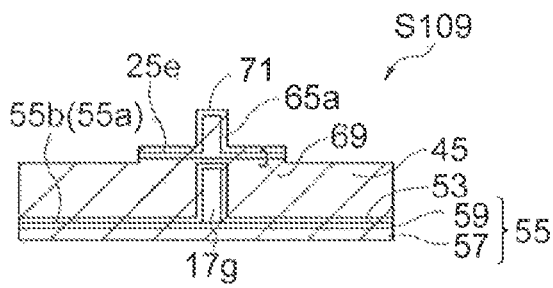
FIGS. 10A to 10E are schematic views showing a major step in the method for fabricating the Mach-Zehnder modulator according to the present embodiment.
Figure 10B:
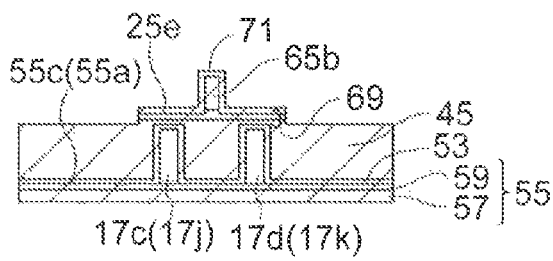
Figure 10C:
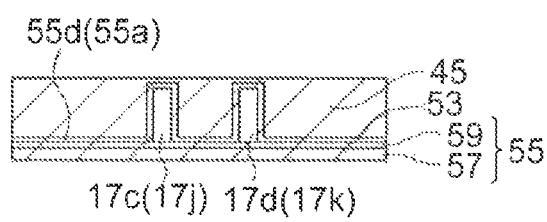
Figure 10D:
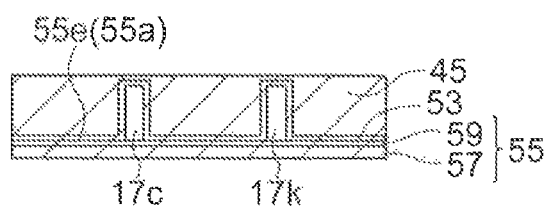
Figure 10E:
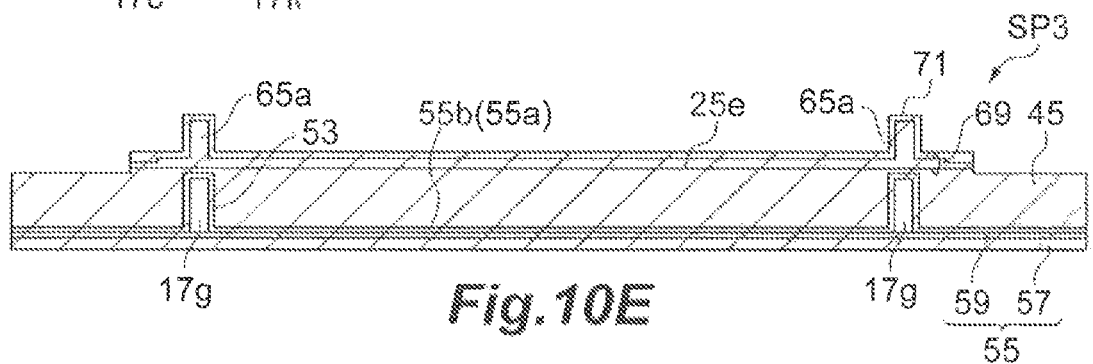

As shown in FIGS. 9A to 9E, in step S108, after exposing the first semiconductor laminate 43, the semiconductor laminate 63 is processed to form a mesa semiconductor 65 for the upper waveguide structure, and a semiconductor layer for the lower contact (the remaining portion of the second semiconductor laminate 63). In order to form the mesa semiconductor 65, a second mask 67 is formed on the second semiconductor laminate 63. The second mask 67 has a pattern that defines the shape of the waveguide and is made of an insulating material. The second mask 67 has a pattern, which provides the first area 55b with a width enabling a single-mode waveguide, and provides the second area 55c with a width smaller than that enabling a single-mode waveguide, and the pattern is terminated in the second area 55c. The second semiconductor laminate 63 is etched with the second mask 67 to form a mesa semiconductor 65. The mesa semiconductor 65 includes a first semiconductor mesa portion 65a and a second semiconductor mesa portion 65b disposed in the first area 55b and the second area 55c, respectively. In order to form the waveguide mesa, the second semiconductor laminate 63 is etched to the fifth semiconductor layer 43e in depth to form the first semiconductor mesa portion 65a and the second semiconductor mesa portion 65b, and further an etched semiconductor layer 43i for the lower contact. As shown in FIG. 8E, the semiconductor layer 43i thus formed includes a difference in level associated with the shape of the preliminarily-patterned first semiconductor layer 43a in the first area 55b. After the etching, the second mask 67 is removed.

As shown in FIGS. 10A to 10E, in the step S109, the etched semiconductor layer 43i is processed to produce an isolation masa 69 for the Mach-Zehnder modulator therefrom. Specifically, in order to form the isolation mesa 69, a third mask 71 is formed on the mesa semiconductor 65 and the semiconductor layer 43i. The third mask 71 is made of an insulator, and has a pattern defining the shape of the isolation mesa 69. Etching the conductive semiconductor layer 43i and a part of the high resistive semiconductor thick film 45 with the third mask 71 provides the isolation. In order to obtain electrical isolation using the isolation mesa 69, the etching depth in the semiconductor layer 43i should exceed the thickness thereof to reach the semiconductor thick film 45 of a high resistivity. In the third area 55d and the I/O area 55e, the semiconductor layer 43i is also removed by the etching to expose the semiconductor thick film 45 of high specific resistance. The isolation mesa 69 includes a lower contact layer 25e. After the etching, the third mask 71 is removed to form the substrate product SP3.

Figure 11A:
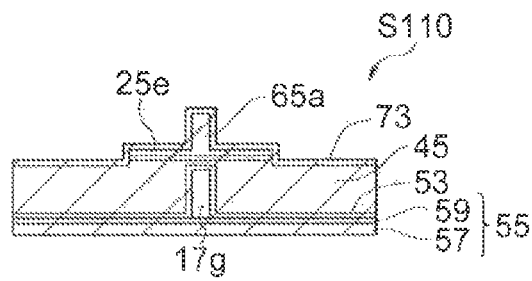
FIGS. 11A to 11E are schematic views showing a major step in the method for fabricating the Mach-Zehnder modulator according to the present embodiment.
Figure 11B:
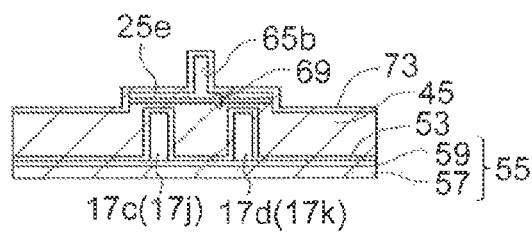
Figure 11C:
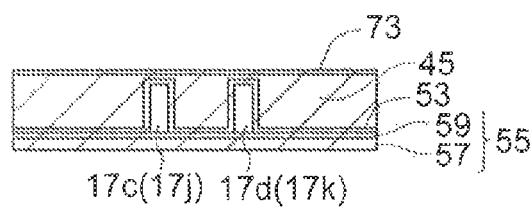
Figure 11D:
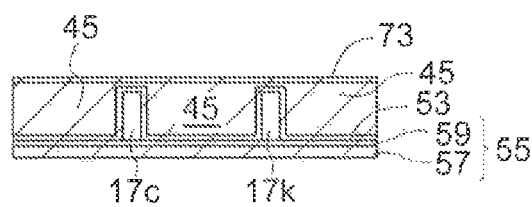
Figure 11E:
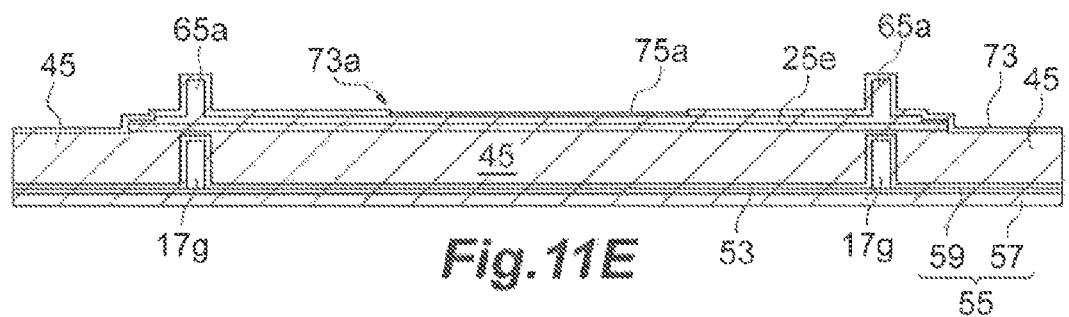
Figure 12A:
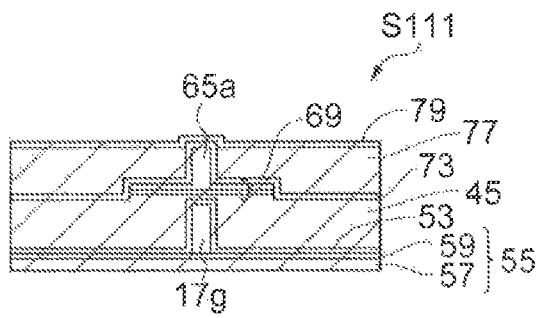
FIGS. 12A to 12E are schematic views showing a major step in the method for fabricating the Mach-Zehnder modulator according to the present embodiment.
Figure 12B:
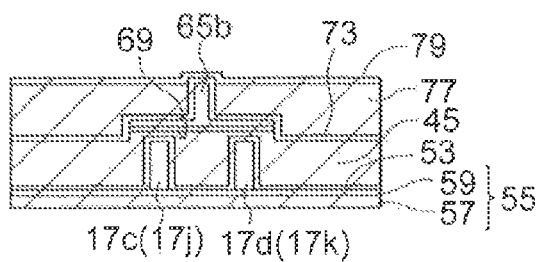
Figure 12C:
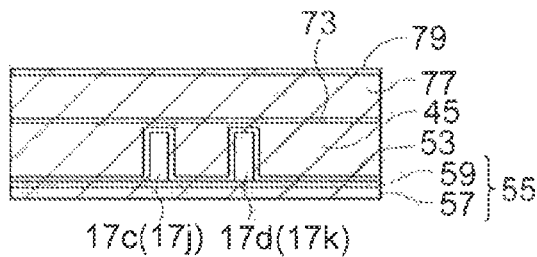
Figure 12D:
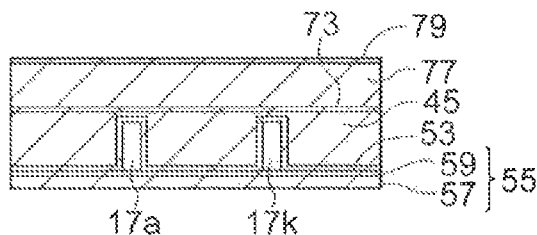
Figure 12E:
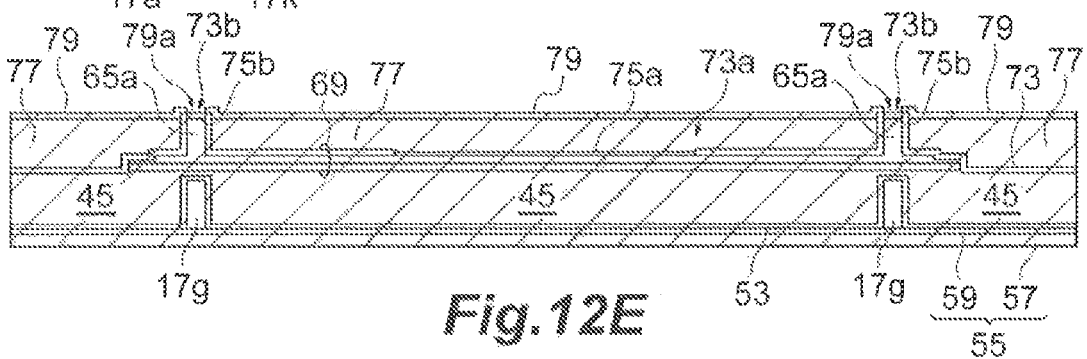
Figure 13A:
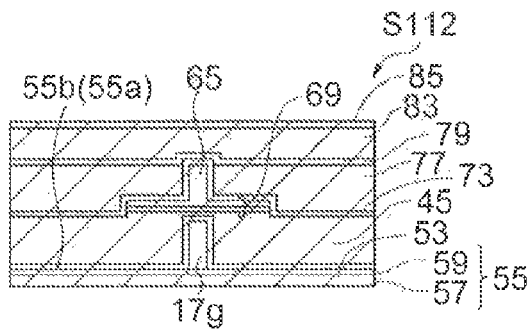
FIGS. 13A to 13E are schematic views showing a major step in the method for fabricating the Mach-Zehnder modulator according to the present embodiment.
Figure 13B:
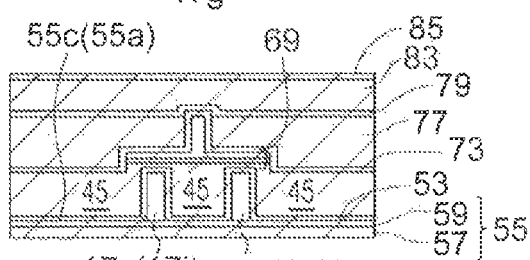
Figure 13C:
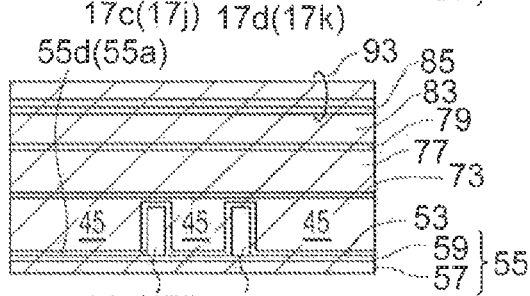
Figure 13D:
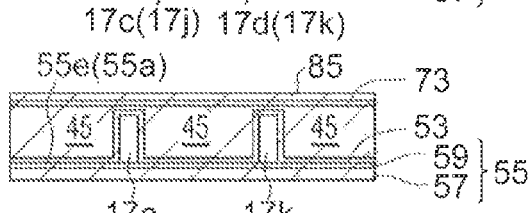
Figure 13E:
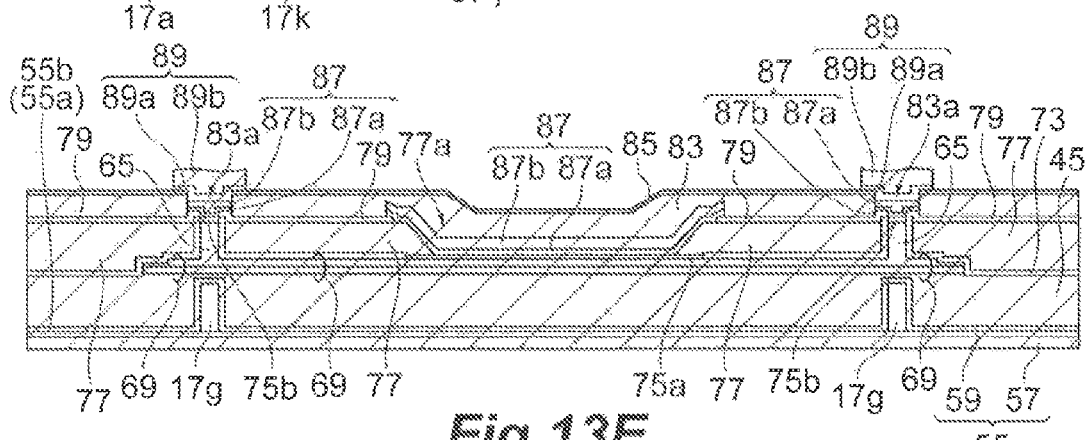

As shown in FIGS. 11A to 11E, in step S110, after the isolation process, a protective dielectric film 73 is grown on the substrate product SP3. The dielectric protective film 73 covers the top and side faces of the mesa semiconductor 65, the top and side faces of the isolation mesa 69, and the surface of the high resistive semiconductor thick film 45. This coating can be provided by the dielectric protective film 73 including a silicon-based inorganic insulating film (for example, a silicon oxide film), and the silicon-based inorganic insulating film can be, for example, a silicon oxide film, which can be deposited by a chemical vapor deposition method. As shown in FIG. 11E, the dielectric protective film 73 has a first opening 73a located on the lower contact layer 25e of the isolation mesa 69, and the first opening 73a is between the first arm waveguide and the second arm waveguide, each of which includes the mesa semiconductor 65 (for example, the first semiconductor mesa portion 65a). In the first opening 73a thus formed, the first ohmic electrode 75a is formed by vapor deposition and lift-off. The first ohmic electrode 75a makes direct contact with the lower contact layer 25e via the first opening 73a.

In the step S111, after the device isolation is obtained, as shown in FIGS. 12A to 12E, a first resin body 77 is formed on the substrate product SP3 to embed the mesa-shaped semiconductor 65 and the isolation mesa 69, which mounts the first ohmic electrode 75a thereon, and the third dielectric film 79 is formed on the first resin body 77. Specifically, a BCB resin (thickness, for example, 2 micrometers) is applied thereto, and the BCB resin thus applied is cured to form the first resin body 77. The third dielectric film 79 includes a silicon-based inorganic insulating film (such as, SiON, 0.2 micrometer thick), and is formed, for example, by chemical vapor deposition. The second opening 73b is formed in the dielectric protective film 73 and the third dielectric film 79, and is located on the top of the mesa-shaped semiconductor 65. Vapor deposition and lift-off are used to obtain a second ohmic electrode 75b in the second opening 73b. The second ohmic electrode 75b makes direct contact with the mesa-shaped semiconductor 65 (specifically, the upper contact layer 25d) via the second opening 73b.

In step S112, as shown in FIGS. 13A to 13E, one electrode in contact with the n-type semiconductor region, another electrode in contact with the p-type semiconductor region, a second resin body 83 and a passivation film 85 are formed. Specifically, the application of photolithography and etching to the first resin body 77 in the first area 55b forms an opening 77a on the first ohmic electrode 75a. A first metal body 87 is formed in the opening 77a, the second ohmic electrode 75b, and the first resin body 77. The first metal body 87 makes contact with the first ohmic electrode 75a and the second ohmic electrode 75b, and includes a seed layer 87a and a gold (Au) layer 87b. The gold layer 87b is formed by plating, and the seed layer is prepared for the plating (such as, the seed layer 87a) and includes a TiW layer, which is formed by sputtering. On the first metal body 87 thus formed, the second resin body 83 and the passivation film 85 (silicon oxide film with a thickness of 0.3 micrometers) are formed. The second resin body 83 can be made of a BCB resin (for example, a thickness of 2 micrometers), which is formed by coating and curing the BCB resin. The application of photolithography and etching to the second resin body 83 and the passivation film 85 in the first area 55b can form an opening 83a on the second ohmic electrode 75b. A second metal body 89 is formed in the opening 83a and the passivation film 85. The second metal body 89 makes contact with the first metal body 87 on the second ohmic electrode 75b, and includes a seed layer 89a and a gold (Au) layer 89b. After the passivation film 85 is formed, a third metal body 91 for the pad electrode is formed on the passivation film 85. The third metal body 91 makes contact with the second metal body 89 in the first area 55b, and includes a seed layer 91a and a gold (Au) layer 91b. An interconnect metal layer 93 is provided in the third area 55d, and may include at least one of the second metal body 89 or the third metal body 91. The interconnect metal layer 93 is formed on the first resin body 77, the second resin body 83, and at least any one of the first strip-shaped semiconductor region 17a, the second strip-shaped semiconductor region 17b, the third strip-shaped semiconductor region 17h, or the fourth strip-shaped semiconductor region 17.

These steps complete the Mach-Zehnder modulator 11. The arrangement of the first structure 15 and the second structure 17 includes no bonding interface between the first structure 15 and the second structure 17, and allows stable light transitions therebetween. The strip-shaped semiconductor region appears at the end face of the semiconductor optical device, and the embedding resin body is not disposed at the end face. The present fabricating method uses silicon oxide films to enable the bonding, and the present embodiment is not limited to such a specific bonding.

Having described and illustrated the principle of the invention in a preferred embodiment thereof, it is appreciated by those having skill in the art that the invention can be modified in arrangement and detail without departing from such principles. We therefore claim all modifications and variations coining within the spirit and scope of the following claims.

What is claimed is:
1. A Mach-Zehnder modulator including:
a support having a principal surface, the principal surface having a first area, a second area, and a third area;
a first structure disposed on the principal surface of the support, the first structure including a first semiconductor mesa and a second semiconductor mesa disposed on the first area and the second area, respectively;
a second structure disposed between the first structure and the principal surface of the support, the second structure including a first strip-shaped semiconductor region, a second strip-shaped semiconductor region, a first strip-shaped void, and a second strip-shaped void, the first strip-shaped semiconductor region and the second strip-shaped semiconductor region being disposed on the second area and the third area, respectively, and the first strip-shaped void and the second strip-shaped void defining the first strip-shaped semiconductor region and the second strip-shaped semiconductor region;

a first electrode disposed on the first semiconductor mesa in the first area and connected to the first semiconductor mesa, the first strip-shaped semiconductor region of the second structure being disposed between the support and the second semiconductor mesa of the first structure in the second area, the second structure including an insulating layer, the insulating layer covering a surface of the second strip-shaped semiconductor region, and the first semiconductor mesa, the second semiconductor mesa, the first strip-shaped semiconductor region, and the second strip-shaped semiconductor region being arranged to constitute a first arm waveguide of the Mach-Zehnder modulator.

2. The Mach-Zehnder modulator according to claim 1, wherein each of the first semiconductor mesa and the second semiconductor mesa includes a first conductive-type semiconductor cladding layer, a core layer, and a second conductive-type semiconductor cladding layer, the second conductive-type semiconductor cladding layer, the core layer and the first conductive-type semiconductor cladding layer are sequentially arranged in a direction of an axis intersecting the principal surface of the support, the first strip-shaped semiconductor region and the second strip-shaped semiconductor region each include a high-specific resistance region having a higher specific resistance than that of the first conductive-type semiconductor cladding layer, and the first electrode is connected to the first conductive-type semiconductor cladding layer, and the Mach-Zehnder modulator further including an interconnect metal layer, the interconnect metal layer passing over the second strip-shaped semiconductor region of the second structure in the third area.

3. The Mach-Zehnder modulator according to claim 2, wherein the high-specific resistance region includes at least one of undoped semiconductor or semiconductor doped with transition metal.

4. The Mach-Zehnder modulator according to claim 1, wherein the first structure includes a third semiconductor mesa and a fourth semiconductor mesa disposed on the first area and the second area, respectively, and the second structure includes a third strip-shaped semiconductor region, a fourth strip-shaped semiconductor region, a third strip-shaped void, and a fourth strip-shaped void, and a branching waveguide, the third strip-shaped semiconductor region and the fourth strip-shaped semiconductor region are disposed on the second area and the third area, the third strip-shaped void and the fourth strip-shaped void define the third strip-shaped semiconductor region and the fourth strip-shaped semiconductor region, and the third strip-shaped semiconductor region and the fourth strip-shaped semiconductor region join together at the branching waveguide.

5. The Mach-Zehnder modulator according to claim 4, further including:

a second electrode connected to a second arm waveguide of the Mach-Zehnder modulator, the second arm waveguide including the third semiconductor mesa, the fourth semiconductor mesa, and the third strip-shaped semiconductor region, and the fourth strip-shaped semiconductor region;

a first interconnect conductor connected to the first electrode; and a second interconnect conductor connected to the second electrode, the second interconnect conductor passing over the second strip-shaped semiconductor region of the second structure in the third area.

6. A method for fabricating a Mach-Zehnder modulator including:

preparing an epitaxial substrate including a laminate and a substrate, the laminate including a semiconductor laminate for an upper waveguide structure and a semiconductor thick film for a lower waveguide structure, the semiconductor thick film being disposed on a first face of the semiconductor laminate, and the substrate mounting the laminate;

forming a first strip-shaped groove and a second strip-shaped groove in the semiconductor thick film to form a semiconductor product;

growing a first insulating film on the semiconductor product;

preparing a supporting substrate having a principal surface with a first area, a second area, and a third area, the supporting substrate including a support and a second insulating film, and the second insulating film being disposed on a principal surface of the support;

carrying out bonding of the first insulating film of the semiconductor product and the second insulating film of the supporting substrate with each other to form a substrate product;

removing the substrate from the substrate product to expose a second face of the semiconductor laminate; and after exposing the second face of the semiconductor laminate, processing the semiconductor laminate to form a first semiconductor mesa and a second semiconductor mesa for the upper waveguide structure, the substrate product including a strip-shaped void and a second strip-shaped void, and the bonding producing the strip-shaped void and the second strip-shaped void from the first strip-shaped groove and the second strip-shaped groove, respectively, the substrate product including a first strip-shaped semiconductor region and a second strip-shaped semiconductor region for the lower waveguide structure, and the strip-shaped void and the second strip-shaped void defining the first strip-shaped semiconductor region and the second strip-shaped semiconductor region, the first strip-shaped semiconductor region and the second strip-shaped semiconductor region being disposed on the second area and the third area, respectively, the first semiconductor mesa and the second semiconductor mesa being disposed on the first area and the second area, respectively, in the second area of the substrate product, the first strip-shaped semiconductor region being disposed between the second semiconductor mesa and the supporting substrate, and the first semiconductor mesa, the second semiconductor mesa, the first strip-shaped semiconductor region and the second strip-shaped semiconductor region being arranged to form a first arm waveguide of the Mach-Zehnder modulator.

* * * * *